United States Patent [19]
Yeakley

[11] Patent Number: 5,219,258
[45] Date of Patent: Jun. 15, 1993

[54] ILLUMINATION APPARATUS FOR A ROBOTIC OBJECT HANDLING SYSTEM

[75] Inventor: Lester M. Yeakley, Boulder, Colo.

[73] Assignee: Storage Technology Corporation, Louisville, Colo.

[21] Appl. No.: 819,749

[22] Filed: Jan. 13, 1992

[51] Int. Cl.$^5$ ............................................. B25J 13/08
[52] U.S. Cl. .................................... 414/275; 294/907; 901/9; 901/35; 901/47; 395/94; 395/126
[58] Field of Search ............... 414/273, 275, 276, 280, 414/751; 901/9, 35, 47; 294/907; 395/94, 126

[56] References Cited

U.S. PATENT DOCUMENTS

| | | | |
|---|---|---|---|
| 3,076,566 | 2/1963 | Dennis | 414/280 |
| 3,822,025 | 7/1974 | Loos | 414/280 |
| 4,908,777 | 3/1990 | Wolfe | 364/513 |
| 5,033,783 | 7/1991 | Izumi et al. | 294/907 X |

Primary Examiner—Michael S. Huppert
Assistant Examiner—Donald W. Underwood
Attorney, Agent, or Firm—Duft, Graziano & Forest

[57] ABSTRACT

The illumination system of the present invention is used with an object handling system to selectively illuminate a predefined target area in a manner that creates a dark area outside of the target area. This illumination system is used in conjunction with an object handling system that contains a plurality of object storage locations located in an array format, such that object storage locations are adjacent to each other both vertically and horizontally. In order to precisely illuminate a selected object storage location and not the adjacent object storage locations, the illumination system of the present invention angularly orients a pair of illumination devices with reference to the object storage locations in order to create shadows outside of a selected object storage location while illuminating the selected object storage location. This is accomplished by displacing the illumination sources such that their angular relationship with respect to the selected object storage location causes the selected object storage location and the object placed therein to cast a shadow beyond the boundaries of the selected object storage location.

12 Claims, 3 Drawing Sheets

ILLUMINATION APPARATUS FOR A ROBOTIC OBJECT HANDLING SYSTEM

FIELD OF THE INVENTION

This invention relates to robotic object handling systems and, in particular, to an object illumination apparatus that operates in conjunction with a vision system in the robotic object handling system to illuminate the objects that are managed by the robotic object handling system.

PROBLEM

It is a problem in the field of robotic object handling systems to precisely position a gripper mechanism with respect to an object stored in an object storage location. Most object handling systems make use of complicated servo systems to precisely position the gripper mechanism. These servo systems typically provide no positive feedback regarding the alignment of the gripper mechanism of the robot with reference to the object to be retrieved on an object by object basis. It is presumed that, once the initial calibration is completed, the robotic gripper positioning mechanism maintains its accuracy due to the precise nature of the servo mechanisms contained therein.

An alternative robotic gripper positioning system is disclosed in U.S. Pat. No. 4,908,777 and makes use of a vision system in conjunction with the gripper mechanism to provide positive visual feedback to enable precise positioning of the gripper mechanism. The vision system typically identifies a target in the workspace in order to determine a benchmark for positioning the gripper mechanism. An example of such a system is the 4400 Automated Cartridge System (ACS) manufactured by Storage Technology Corporation of Louisville, Colo. The 4400 ACS consists of a large number of object storage locations which are configured in two concentric cylindrical arrays, the openings of which face into the intercylinder space. A robot mechanism operates within this space in order to retrieve 3480-type magnetic tape cartridges that are stored in the cartridge storage locations.

Each cartridge storage location in these arrays include a vision system calibration target that consists of a pair of bars oriented at right angles to each other and located at the lower lefthand corner of the face of the cartridge storage location. The robotic gripper positioning mechanism positions the gripper mechanism opposite a selected cartridge storage location and juxtaposed thereto in order to retrieve a magnetic tape cartridge therefrom. The vision system accomplishes a fine positioning of the gripper mechanism with respect to the cartridge by orienting the gripper mechanism with reference to the calibration target on the cartridge storage location. In addition, the vision system reads a bar coded label that is affixed to the end of the magnetic tape cartridge in order to positively identify the magnetic tape cartridge before retrieving it from its cartridge storage location.

A difficulty with this arrangement is that the cartridge storage locations are placed in close proximity to each other in order to maximize the storage capacity of this cartridge library system. The illumination apparatus presently in use in this cartridge library system illuminates not only the label on the selected magnetic tape cartridge and the target associated with this selected cartridge storage location, but also the label on the magnetic tape cartridge stored in the cartridge storage location immediately below the selected cartridge storage location. Therefore, if the magnetic tape cartridge (or its label), housed in the cartridge storage location located immediately below the selected cartridge storage location, is highly reflective, such as a white or yellow color, it is difficult for the vision system to distinguish between that magnetic tape cartridge or its label and the calibration target on the lower lefthand corner of the selected cartridge storage location. The vision system has a fairly wide field of vision which encompasses not only the label on the selected magnetic tape cartridge, its cartridge storage location with its associated calibration target but also the magnetic tape cartridge and its label located immediately below the selected magnetic tape cartridge. The orientation of these elements is such that the line of demarkation between the calibration target on the selected cartridge storage location and the magnetic tape cartridge (with its label) in the cartridge storage location located immediately below the selected cartridge storage location may not be distinguishable to the vision system, thereby defeating the purpose of the calibration target.

SOLUTION

The above described problems are solved and a technical advance achieved in the field by the illumination system of the present invention which is oriented to efficiently illuminate a selected work area and concurrently create darkened areas around the work area. This is accomplished by providing a pair of illumination devices positioned so that their light beams cross before striking the target area to not only illuminate the target area but cast shadows on the adjacent areas.

The cartridge storage locations in the 4400 ACS are configured as a vertically oriented stack of rows of cartridge storage locations. Each row of cartridge storage locations is aligned with the row above and below, such that the cartridge storage locations are vertically aligned from the top most row to the bottom most row in the array. There is a predetermined amount of space between the end faces of adjacent rows of cartridge storage locations and angularly displacing the light sources on the gripper mechanism the maximum distance from each end of the target area creates shadows cast by the magnetic tape cartridge and the cartridge storage location itself on to the cartridge storage location below the selected cartridge storage location. Therefore, the edges of the selected cartridge storage location and its target are clearly demarked by a dark shadow area that is cast by the illumination system. This enables the vision system associated with the gripper mechanism to accurately locate the calibration target on the selected cartridge storage location in order to precisely position the gripper mechanism.

The cartridge storage locations are aligned such that the magnetic tape cartridges are stored in a vertical orientation. The gripper mechanism includes two illumination sources, one located at the top thereof and one located at the bottom thereof, both facing the cartridge storage location. The top illumination source illuminates the bottom half of the selected cartridge storage location while the bottom illumination source illuminates the top half of the selected cartridge storage location. This cross illumination arrangement completely illuminates the selected cartridge storage location and the cartridge located therein but, due to the angular relationship of the illumination sources with reference to the selected cartridge storage location, casts heavy shadows beyond the periphery of the selected cartridge storage location on to the magnetic tape cartridge stored in the cartridge storage location immediately below the selected cartridge storage location.

DETAILED DESCRIPTION

The illumination system of the present invention is used with an object handling system to selectively illuminate a predefined target area in a manner that creates a dark area outside of the target area. This illumination system is used in conjunction with an object handling system that contains a plurality of object storage locations located in an array format, such that object storage locations are adjacent to each other both vertically and horizontally. In order to precisely illuminate a selected object storage location and not the adjacent object storage locations, the illumination system of the present invention angularly orients a pair of illumination sources with reference to the object storage locations in order to create shadows outside of a selected object storage location target while illuminating the selected object storage location.

This is accomplished by displacing the illumination sources such that their angular relationship with respect to the selected object storage location causes the selected object storage location and the object placed therein to cast a shadow beyond the boundaries of the selected object storage location. The illumination sources are oriented such that their light beams cross the line of sight of the vision system before reaching the selected target area.

Cartridge Storage Locations

Figure 1:
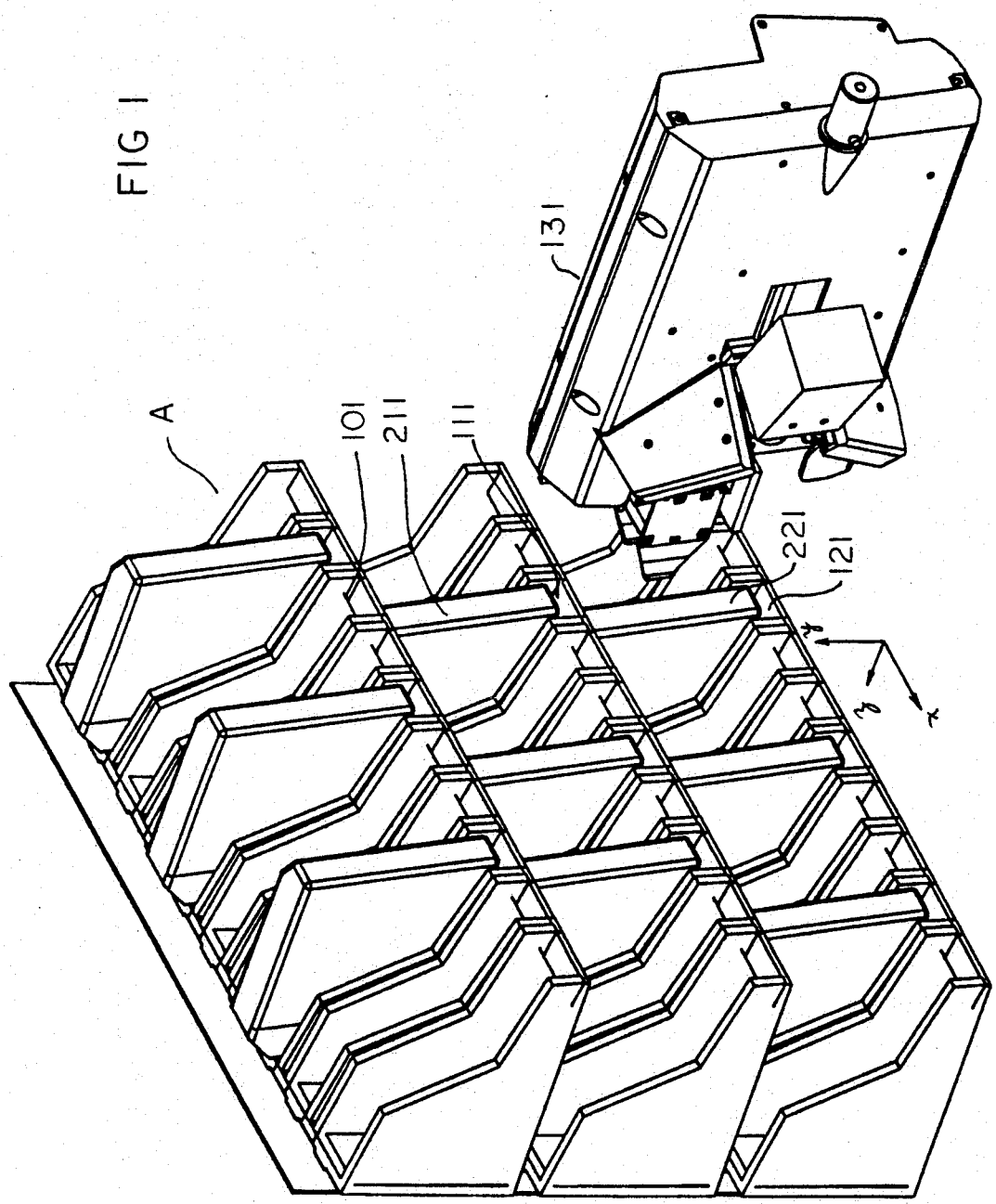
FIG. 1 illustrates a perspective view of a section of the array of object storage locations with the object retrieval mechanism oriented adjacent thereto.

FIG. 1 illustrates a perspective view of a segment of a typical array A of object storage locations 101–121. FIG. 1 also illustrates a gripper mechanism 131, with its associated illumination sources 133, 134 and vision system 132, positioned adjacent a selected object storage location 111 in the array A of object storage locations. This array A is illustrative of those found in a 4400 Automated Cartridge System wherein each object storage location consists of a tray, sloping downwardly from the front end thereof to the rear wall of the array and including sides that partially enclose the object storage location. Each object storage location is designed to house a single 3480-type magnetic tape cartridge and therefore, the object storage locations described herein are termed cartridge storage locations.

Figure 3:
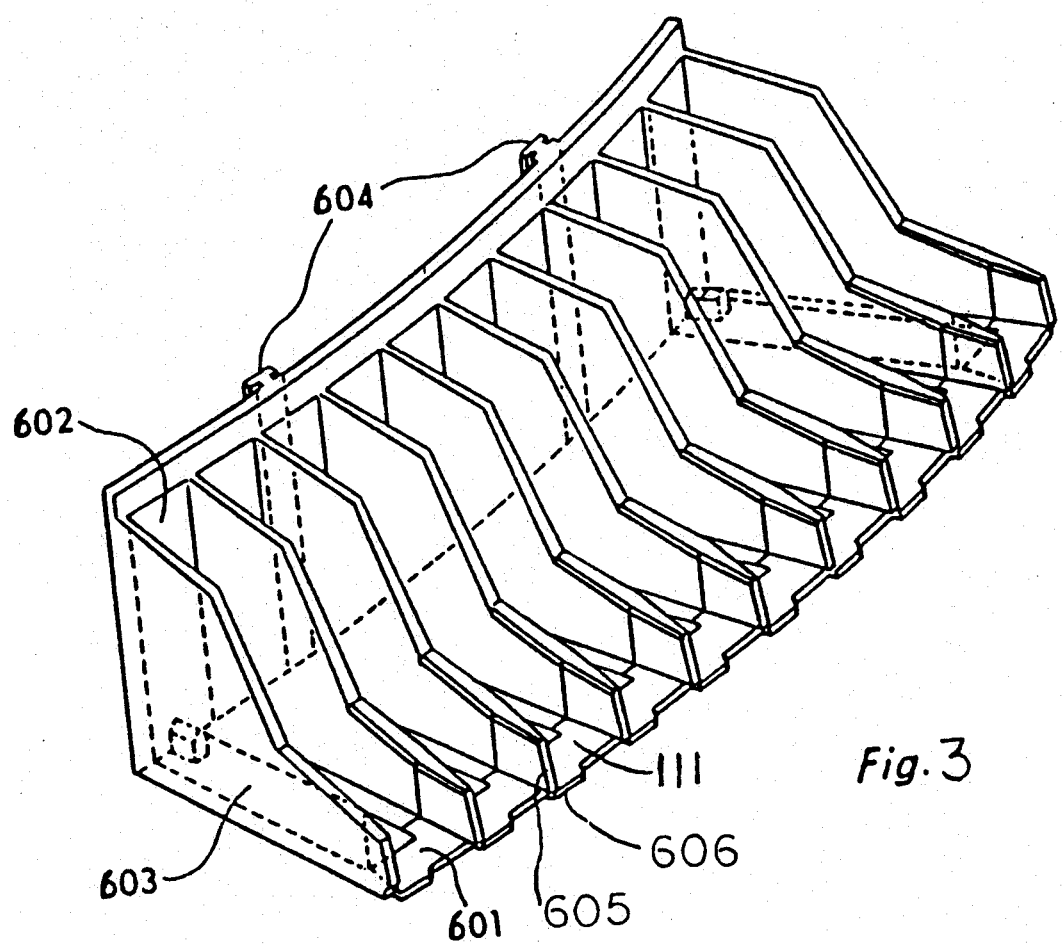
FIG. 3 illustrates a front view of the object storage location and its vision system calibration target.

A section of the array of cartridge storage locations is illustrated in FIG. 3 and consists of a bottom portion 601, a back portion 602 with intervening wall segments 603 to provide a plurality of individual cartridge storage locations (such as 111 on FIG. 1), each of which houses a single 3480-type magnetic tape cartridge 211. Bottom portion 601 of the storage locations is angled downward, front to back, so that a magnetic tape cartridge 211 placed in a cartridge storage location 111 tends to slide along bottom portion 601 into the cartridge storage location 111. The wall segments 603 are adapted to enable a robotic finger gripper 131 to grasp a cartridge 211 stored in the cartridge storage location 111 for retrieval therefrom. In addition, hooks 604 are formed at the rear of the array of cartridge storage locations and can be used to connect the array to a frame in a library system.

Figure 2:
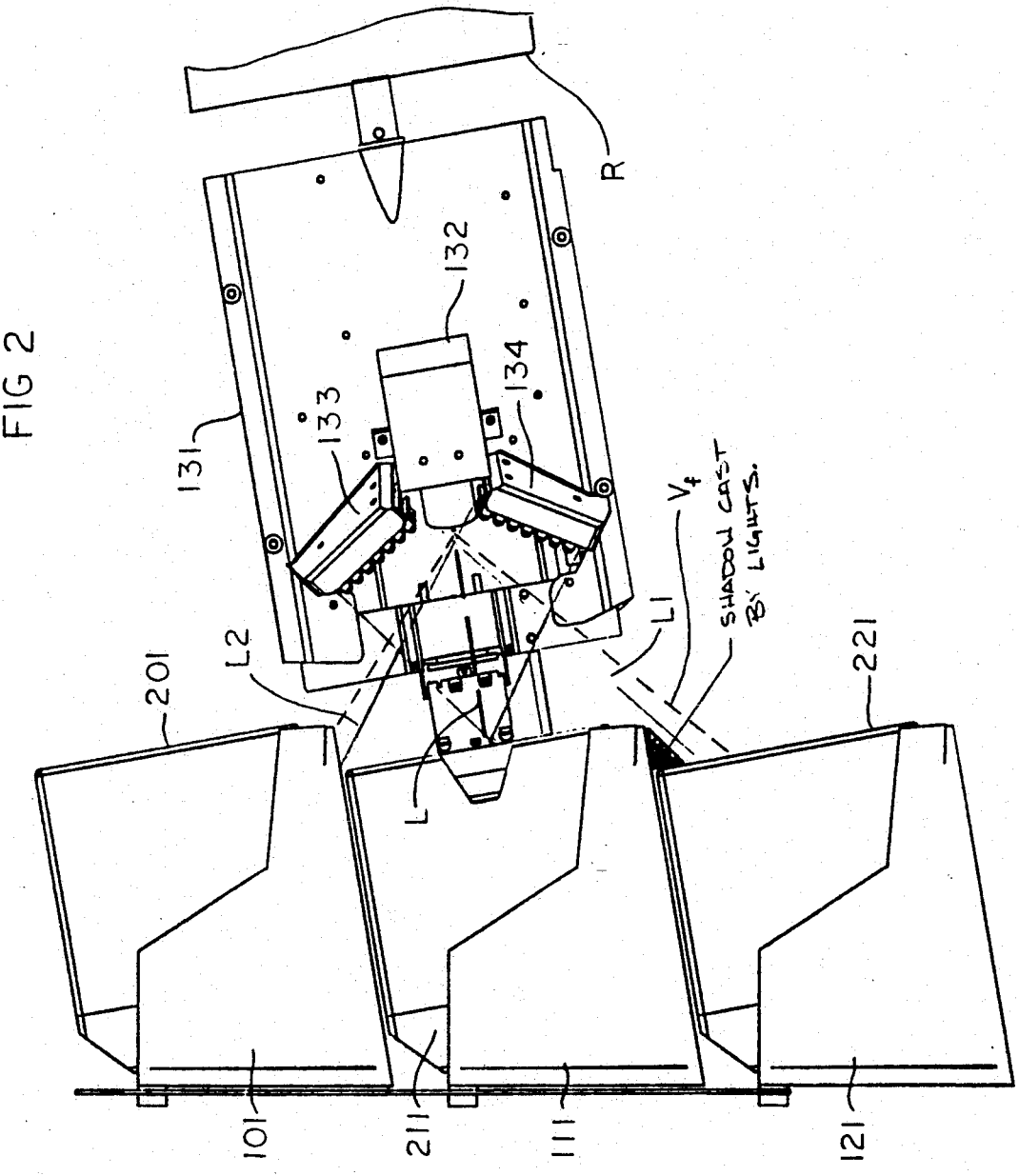
FIG. 2 illustrates a side view of the illumination system affixed to the gripper mechanism and the illumination pattern created by the illumination system.

Each cartridge storage location 111 includes an L-shaped vision system calibration target 605, 606 to enable vision system 132 to precisely align gripper mechanism 131 exactly opposite cartridge storage location 111 and juxtaposed thereto to retrieve cartridge 121. The vertical bar 605 of the calibration target 605, 606 provides a point of reference in the x-axis direction while horizontal bar 606 provides a point of reference in the y-axis direction. Vision system 132 has a field of vision $V_F$ (FIG. 2) oriented along a line of sight L, such that the line of sight L is aimed at the center of the selected cartridge storage location 111 to enable the vision system field of vision $V_F$ to encompass a target area including: all of cartridge 211, object storage location 111, calibration target 605, 606 on object storage location 111; as well as a certain amount of the space surrounding this target area. The image produced by vision system 132 is read by a processor (not shown) in robotic object handling system R and a comparison is made between the position of calibration target 605, 606 in this image and a predefined desirable position of calibration target 605, 606 in this image. Gripper mechanism 131 is repositioned based upon any positional variance determined in this comparison, to precisely align gripper mechanism 131 with reference to cartridge storage location 111.

Vision System Field of Vision

Due to the sloping nature of the cartridge storage location 111, the front bottom of the cartridge storage location 111 overhangs the top of a magnetic tape cartridge 221 stored in the cartridge storage location 121 immediately below the selected cartridge storage location 111. Even though there is a predetermined amount of vertical space between successive rows of cartridge storage locations, the location of the vision system 132 in the center of the gripper mechanism 131 and the angular relationship of the cartridges 101–121 and cartridge storage locations 201–221 cause the field of Vision $V_F$ (FIG. 2) of the vision system 132 to include a portion of cartridge 221 and the label affixed to the cartridge 221 stored in a cartridge storage location 121 in the row immediately below the selected cartridge storage location 111 to appear juxtaposed to the bottom of the selected cartridge storage location 111. Since two bars 605, 606 of the calibration target 605, 606 of cartridge storage location 111 enable the vision system 132 to precisely locate the gripper mechanism 131 with respect to the cartridge storage location 111, an accurate comparison must be made of the position of these two bars 605, 606 in the field of vision $V_F$ of the vision system 132 with respect to a predetermined desired location of the calibration target in the field of vision $V_F$ of the vision system 132 as programmed in memory in the cartridge library system. Therefore, an inability of the vision system 132 to distinguish between a horizontal bar 606 of the calibration target 605, 606 on a selected cartridge storage location 111 and a cartridge 221 or the label affixed to a magnetic tape cartridge 221 stored in a cartridge storage location 121 immediately below the selected cartridge storage location 111 can result in a significant lack of alignment of the gripper mechanism 131 in the vertical (y axis) direction.

The existing illumination system used in the 4400 Automated Cartridge System makes use of two high intensity lamps positioned one on either side of the vision system to illuminate the selected cartridge storage location. The difficulty with that arrangement is that the lamps each generate a light beam that is parallel to the line of sight of the vision system and therefore illuminate not only the label on the selected magnetic tape cartridge and the associated calibration target but also an area surrounding this location, including the magnetic tape cartridge and its label affixed to the magnetic tape cartridge below the selected magnetic tape cartridge. The use of predetermined dark colors for the cartridge, such that they are not highly reflective, minimizes the problem caused by this arrangement, but the labeling on the magnetic tape cartridges is a user function beyond the control of the manufacturer of the automated cartridge library system.

Illumination System

The illumination system 133, 134 of the present invention was developed in order to obviate the need for regulating acceptable magnetic tape cartridge and label format and content. The illumination system 133, 134 of the present invention consists of a pair of light sources 133, 134, each of which is housed in a shell type portion of the enclosure of gripper mechanism 131. The light sources 131, 134 used herein are a rectangular array of light emitting diodes, the operating wavelength of which is selected to be compatible with the operating wavelength of vision system 132. The illumination sources 133, 134 are angularly displaced with respect to each other and with respect to the line of sight L of the vision system 132 such that the light beams L1, L2 produced by each of the illumination sources 133, 134 cross the line of sight L of the vision system 132 before the light beams L1, L2 generated by the illumination sources 133, 134 reach the cartridge 211 stored in the selected cartridge storage location 111. Thus, the illumination source 133 located above the vision system 132 illuminates the bottom half of the label affixed to the selected magnetic tape cartridge 211, while the illumination source 134 located below the vision system 132 illuminates the top half of the label affixed to the selected magnetic tape cartridge 211. As can be seen from FIG. 2, the field of vision $V_F$ of the vision system 131 includes not only the label affixed to the selected magnetic tape cartridge 211 stored in the selected cartridge storage location 111 and the calibration target 605, 606 but also the magnetic tape cartridge 221 (and its label) stored in the cartridge storage location 121 located immediately below the selected magnetic tape cartridge storage location 111. The target area is more readily distinguished from the surrounding area because the light beams L1, L2 generated by each of the light sources 133, 134 impacts the label on the selected magnetic tape cartridge 211 on an acute angle rather than at right angles thereto. The positioning of the light sources 133, 134 diagonally opposite the area of the label that is to be illuminated by the light sources 133, 134 causes the cartridge storage location 111 and its target 605, 606 to cast a shadow on the top of the cartridge 221 stored in the cartridge storage location 121 located immediately below the selected cartridge storage location 111. Thus, there is a significant anomaly with respect to the level of illumination applied to the selected magnetic tape cartridge 211 and the cartridge 221 stored in the cartridge storage location 121 immediately below the selected cartridge storage location 111. This illumination anomaly is easily detected by the vision system 132 and can be used to delineate the boundaries of the calibration target 605, 606 affixed to the selected magnetic tape cartridge storage location 111.

This methodology can be used for other object storage location configurations, such as an xy rectilinear array of object storage locations, where the spacing between adjacent object storage locations is close enough to cause an overlap in the field of vision of the vision system from one object to another.

While a specific embodiment of this invention has been disclosed, it is expected that those skilled in the art can and will design alternate embodiments of this invention that fall within the scope of the appended claims.

I claim:

1. In an object handling system that includes a plurality of object storage locations arranged in an array configuration, with each object storage location being juxtaposed to at least one other object storage location and having an end face spaced from an end face of said at least one other object storage location and also including a gripper mechanism positionable opposite a selected object storage location for manipulating an object stored in said selected object storage location, an object illumination apparatus attached to said gripper mechanism comprising:

vision system means having a line of sight, and having a field of vision that is focused on a location adjacent said gripper mechanism, which location includes said selected object storage location when said gripper mechanism is positioned opposite said selected object storage location, for generating an image of said selected object storage location;

first illumination source means, located on a first side of said vision system means, for generating a first beam of light and aligned to side illuminate said selected object storage location, wherein said first beam of light crosses said line of sight prior to reaching said selected object storage location;

second illumination source means, located on a second side of said vision system means, opposite said first side, for generating a second beam of light and aligned to side illuminate said selected object storage location, wherein said second beam of light crosses said line of sight prior to reaching said selected object storage location; and wherein said first and second light beams side illuminate said selected object storage location, causing said selected object storage location to cast shadows on at least one of said juxtaposed object storage locations.

2. The apparatus of claim 1, wherein said gripper mechanism has a top and a bottom, which comprise said first and second sides and are substantially aligned with a corresponding top and bottom of said selected object storage location when said gripper is positioned opposite said selected object storage location, said first illumination source means is attached to said gripper mechanism proximate said top thereof and aligned to illuminate an area proximate said bottom of said selected object storage location.

3. The apparatus of claim 2 wherein said second illumination source means is attached to said gripper mechanism proximate said bottom thereof and aligned to illuminate an area proximate said top of said selected object storage location.

4. The apparatus of claim 1, wherein said gripper mechanism has a top and a bottom, which comprise said first and second sides and are substantially aligned with a corresponding top and bottom of said selected object storage location when said gripper is positioned opposite said selected object storage location, said second illumination source means is attached to said gripper mechanism proximate said bottom thereof and aligned to illuminate an area proximate said top of said selected object storage location.

5. The apparatus of claim 1 wherein said first and said second illumination source means each comprise a plurality of light emitting diodes, whose operating wavelength substantially corresponds to an operating wavelength of said vision system means.

6. The apparatus of claim 5 wherein said plurality of light emitting diodes are configured into a rectilinear array.

7. In a magnetic tape cartridge handling system that includes a plurality of rectangular box-shaped cartridge storage locations arranged in an array configuration, with each cartridge storage location being juxtaposed to at least one other cartridge storage location and having an end face spaced from an end face of said at least one other object storage location and including a vision system calibration target on one corner thereof juxtaposed to one of said at least one juxtaposed cartridge storage locations, and also including a gripper mechanism positionable opposite a selected cartridge storage location for manipulating a magnetic tape cartridge stored in said selected cartridge storage location, an illumination apparatus attached to said gripper mechanism comprising:

vision system means having a line of sight, and having a field of vision that is focused on a location adjacent said gripper mechanism, which location includes said selected cartridge storage location when said gripper is positioned opposite said selected cartridge storage location, for generating an image of said selected cartridge storage location;

first illumination source means, located on a first side of said vision system means, for generating a first beam of light and aligned to side illuminate said selected cartridge storage location, wherein said first beam of light crosses said line of sight prior to reaching said selected cartridge storage location;

second illumination source means, located on a second side of said vision system means opposite said first side, for generating a second beam of light and aligned to side illuminate said selected cartridge storage location, wherein said second beam of light crosses said line of sight prior to reaching said selected cartridge storage location; and wherein said first and second light beams side illuminate said selected cartridge storage location, causing said selected cartridge storage location to cast shadows on said one juxtaposed cartridge storage location to delineate said calibration target from said one juxtaposed cartridge storage location.

8. The apparatus of claim 7, said gripper mechanism has a top and a bottom, which comprise said first and second sides and are substantially aligned with a corresponding top and bottom of said selected cartridge storage location when said gripper is positioned opposite said selected cartridge storage location, said first illumination source means is attached to said gripper mechanism proximate said top thereof and aligned to illuminate a section of a cartridge housed in said selected cartridge storage location proximate said bottom of said selected cartridge storage location.

9. The apparatus of claim 8 wherein said second illumination source means is attached to said gripper mechanism proximate said bottom thereof and aligned to illuminate a section of a cartridge housed in said selected cartridge storage location proximate said top of said selected cartridge storage location.

10. The apparatus of claim 7, wherein said gripper mechanism has a top and a bottom, which comprise said first and second sides and are substantially aligned with a corresponding top and bottom of said selected cartridge storage location when said gripper is positioned opposite said selected cartridge storage location, said second illumination source means is attached to said gripper mechanism proximate said bottom thereof and aligned to illuminate a section of a cartridge housed in said selected cartridge storage location proximate said top of said selected cartridge storage location.

11. The apparatus of claim 7 wherein said first and said second illumination source means each comprise a plurality of light emitting diodes, whose operating wavelength substantially corresponds to an operating wavelength of said vision system means.

12. The apparatus of claim 7 wherein said plurality of light emitting diodes are configured into a rectilinear array.

* * * * *